(12) United States Patent
Wagner

(10) Patent No.: US 11,810,115 B2
(45) Date of Patent: *Nov. 7, 2023

(54) METHOD AND SYSTEM FOR DETERMINING TERMINAL LOCATIONS

(71) Applicant: Visa International Service Association, San Francisco, CA (US)

(72) Inventor: Kim R. Wagner, Sunnyvale, CA (US)

(73) Assignee: Visa International Service Association, San Francisco, CA (US)

(*) Notice: Subject to any disclaimer, the term of this patent is extended or adjusted under 35 U.S.C. 154(b) by 584 days.

This patent is subject to a terminal disclaimer.

(21) Appl. No.: 16/566,408

(22) Filed: Sep. 10, 2019

(65) Prior Publication Data

US 2020/0005316 A1  Jan. 2, 2020

Related U.S. Application Data

(63) Continuation of application No. 15/042,832, filed on Feb. 12, 2016, now Pat. No. 10,453,065.

(51) Int. Cl.
*G06Q 20/40* (2012.01)
*G06Q 20/32* (2012.01)

(52) U.S. Cl.
CPC ..... *G06Q 20/4016* (2013.01); *G06Q 20/3224* (2013.01)

(58) Field of Classification Search
CPC .................................................. G06Q 20/4016
(Continued)

(56) References Cited

U.S. PATENT DOCUMENTS

| 6,612,488 B2 | 9/2003 | Suzuki |
| 6,832,721 B2 | 12/2004 | Fujii |

(Continued)

FOREIGN PATENT DOCUMENTS

| KR | 20080023407 | 3/2008 |
| KR | 1020110069911 | 6/2011 |

(Continued)

OTHER PUBLICATIONS

Authors: F. Meneses et al: Using GSM CellID Positioning for Place Discovering; IEEE Conf. Paper: IEEE XPLORE: Last Update Date: Jun. 4, 2007 Publication Date: Nov. 1, 2006 (Year: 2006).*

(Continued)

*Primary Examiner* — Bruce I Ebersman
*Assistant Examiner* — Hatem M Ali
(74) *Attorney, Agent, or Firm* — Kilpatrick Townsend & Stockton LLP

(57) ABSTRACT

Described herein is a platform and method for generating a terminal location from transaction data. In some embodiments, location data is periodically provided to a service computer from multiple mobile devices. Additionally, transaction data related to terminals may be provided to the service provider by one or more entities. The service provider may be configured to match records in the received transaction data to records in the received location data to identify a set of potential terminal locations. In some embodiments, the set of potential terminal locations may be filtered according to one or more criteria. A terminal location may subsequently be approximated from the set of potential terminal locations.

15 Claims, 6 Drawing Sheets

(58) Field of Classification Search
USPC .......................................................... 705/44
See application file for complete search history.

(56) References Cited

U.S. PATENT DOCUMENTS

| | | | |
|---|---|---|---|
| 6,913,194 | B2 | 7/2005 | Suzuki |
| 6,948,656 | B2 | 9/2005 | Williams |
| 7,104,444 | B2 | 9/2006 | Suzuki |
| 7,152,788 | B2 | 12/2006 | Williams |
| 7,500,607 | B2 | 3/2009 | Williams |
| 7,503,489 | B2 | 3/2009 | Heffez et al. |
| 7,594,605 | B2 | 9/2009 | Aaron et al. |
| 7,669,759 | B1 * | 3/2010 | Zettner ............... H04M 7/0024 235/492 |
| 7,684,809 | B2 | 3/2010 | Niedermeyer |
| 7,697,942 | B2 | 4/2010 | Stevens |
| 7,743,981 | B2 | 6/2010 | Williams |
| 7,747,535 | B2 | 6/2010 | Mikan et al. |
| 7,752,135 | B2 | 7/2010 | Brown et al. |
| 8,116,731 | B2 | 2/2012 | Buhrmann et al. |
| 8,135,624 | B1 | 3/2012 | Ramalingam et al. |
| 8,140,403 | B2 | 3/2012 | Ramalingam et al. |
| 8,166,068 | B2 | 4/2012 | Stevens |
| 8,280,348 | B2 | 10/2012 | Snyder et al. |
| 8,285,639 | B2 * | 10/2012 | Eden ....................... G06Q 20/04 705/40 |
| 8,315,947 | B2 | 11/2012 | Aaron et al. |
| 8,341,029 | B1 | 12/2012 | Ramalingam et al. |
| 8,374,634 | B2 * | 2/2013 | Dankar ................ G06Q 20/384 370/328 |
| 8,401,906 | B2 | 3/2013 | Ruckart |
| 8,588,748 | B2 | 11/2013 | Buhrman et al. |
| 8,615,465 | B2 | 12/2013 | Boutcher et al. |
| 8,632,002 | B2 | 1/2014 | Boutcher et al. |
| 9,129,281 | B2 | 9/2015 | Perry et al. |
| 9,270,717 | B1 | 2/2016 | Neill et al. |
| 9,659,312 | B1 | 5/2017 | Ellis et al. |
| 2009/0157418 | A1 * | 6/2009 | Coleman ............... G01S 5/0009 342/357.31 |
| 2009/0187492 | A1 | 7/2009 | Hammad et al. |
| 2010/0274679 | A1 | 10/2010 | Hammad |
| 2013/0046692 | A1 | 2/2013 | Grigg et al. |
| 2013/0198046 | A1 | 8/2013 | Hammad et al. |
| 2013/0203444 | A1 | 8/2013 | Perry et al. |
| 2014/0122337 | A1 * | 5/2014 | Kang .................. G06Q 20/3224 705/44 |
| 2015/0302411 | A1 | 10/2015 | Bondesen et al. |
| 2016/0019547 | A1 | 1/2016 | Gurnani et al. |
| 2017/0236124 | A1 | 8/2017 | Wagner |

FOREIGN PATENT DOCUMENTS

| | | | | |
|---|---|---|---|---|
| KR | 1020150064592 | | 6/2015 | |
| KR | 1020150098486 | | 8/2015 | |
| WO | 2013062214 | | 5/2013 | |
| WO | WO-2014033239 | A1 * | 3/2014 | ......... G01C 21/3415 |
| WO | 2017139020 | | 8/2017 | |

OTHER PUBLICATIONS

Authots: Jukka-Pekka Laulajainen et al: Study of YouTube demand patterns in mixed public and campus WiFi network; IEEE Conf. Paper; Last Update Date: Oct. 17, 2014 Publication Date: Aug. 1, 2014 (Year: 2014).*
Authors: F. Meneses et al: Using GSM Cell ID Positioning for Place Discovering; IEEE Conf. Paper: IEEE XPLORE: Last Update Date: Jun. 4, 2007 Publication Date: Nov. 1, 2006 (Year: 2006) (Year: 2014).*
Authors: Jukka-Pekka Laulajainen et al: Study of YouTube demand patterns in mixed public and campus WiFi network; IEEE Conf. Paper; Last Update Date: Oct. 17, 2014; Publication Date:Aug. 1, 2014(Year:2014) (Year: 2014).*
Authors: Tikamadas, P.S. et al; Title: Direction-based proximity detection algorithm for location-based services; Publication Date: Apr. 1, 2009; Conference Start Date: Apr. 28, 2009 (Year: 2009).*
1. Authors: F. Meneses et al: Using GSM Cell ID Positioning for Place Discovering; IEEE Cont. Paper: IEEEXPLORE: Lasr Update Date: Jun. 4, 2007 (Year: 2007).*
2. Authors: Jukka-Pekka Laulajainen et al: Study of You Tube demand patterns in mixed public and campus WiFi network; IEEE Conf. Paper; Last Update: Oct. 17, 2014; Publication Date: Aug. 1, 2014(Year:2014) (Year: 2014).*
1. Authors: F. Meneses et al: Using GSM Cell ID Positioning for Place Discovering; IEEE Cont. Paper: IEEEXPLORE: Lasr Update Date: Jun. 4, 2007 (Year: 2007) (Year: 2007).*
2. Authors: Jukka-Pekka Laulajainen et al: Study of You Tube demand patterns in mixed public and campus WiFi network; IEEE Conf. Paper; Last Update: Oct. 17, 2014; Publication Date: Aug. 1, 2014(Year:2014) (Year: 2014) (Year: 2014).*
3. Authors: Chao Li et al; Title: Locating POS Terminals from Credit Card Transactions; Pub: IEEE; Date of Conference: Dec. 14-17, 2014 (Year: 2014).*
4. Authors: Ramya Bygari et al; Title: An AI-powered Smart Routing Solution for Payment Systems; Pub: IEEE; Date of Conference: Dec. 15-18, 2021 (Year: 2021).*
EP16890111.4 , "Office Action", dated Feb. 27, 2020, 8 pages.
EP16890111.4 , "Summons to Attend Oral Proceedings", Jun. 29, 2021, 10 pages.
"Terminal ID (MerchantTerminal Number) in Real-Time Payment Manager", Payeezy Knowledge Base, 2016, 3 pages.
U.S. Appl. No. 15/042,832 , "Final Office Action", dated Nov. 17, 2017, 13 pages.
U.S. Appl. No. 15/042,832 , "Final Office Action", dated Sep. 21, 2018, 18 pages.
U.S. Appl. No. 15/042,832 , "Non Final Office Action", dated Apr. 19, 2018, 11 pages.
U.S. Appl. No. 15/042,832 , "Non-Final Office Action", dated Jul. 17, 2017, 21 pages.
U.S. Appl. No. 15/042,832 , "Notice of Allowance", dated Jun. 13, 2019, 17 pages.
EP16890111.4 , "Extended European Search Report", dated Dec. 17, 2018, 8 pages.
Myllymaki et al., "Location aggregation from multiple sources", Proceedings of Third International Conference on Mobile Data Management, Aug. 7, 2002, 8 pages.
PCT/US2016/066720 , "International Preliminary Report on Patentability", dated Aug. 23, 2018, 7 pages.
PCT/US2016/066720 , "International Search Report and Written Opinion", dated Apr. 3, 2017, 10 pages.

* cited by examiner

METHOD AND SYSTEM FOR
DETERMINING TERMINAL LOCATIONS

CROSS-REFERENCES TO RELATED
APPLICATIONS

The present application is a continuation of U.S. patent application Ser. No. 15/042,832 filed on Feb. 12, 2016, the entire disclosure of which is incorporated herein by reference in their entirety for all purposes.

BACKGROUND

There are a number of cases in which it can be desirable to verify that a person conducting a transaction did in fact conduct the transaction. In one example, a person conducting a payment transaction with another's account may be conducting that payment transaction fraudulently. In another example, a person attempting to access a building with a stolen access badge may attempt to fraudulently gain access to the location. In these instances, one way to help ensure that the authorized user is the correct user is to determine if the location of the mobile phone of an authorized user matches the location of the terminal at which the person is conducting the transaction. If the locations match, then the person is likely the authentic user, because a fraudulent user would not be in possession of the legitimate user's mobile phone.

One problem with the verification process that is described above is that a remote computer that is making the determination as to whether the person is the legitimate user may not have a clear indication of where the terminal is located. New terminals may be installed frequently and it is difficult to determine the location of these terminals unless the owner of those terminals somehow pre-register the exact coordinates of those terminals with the remote computer beforehand. Also, even if terminals can be pre-registered with their locations, the terminals can be moved by the personnel maintaining them. As such, it is very difficult to determine with any degree of certainty that the person is in fact authorized to access a given resource or location associated with a particular terminal.

Embodiments of the invention address these and other problems, individually and collectively.

BRIEF SUMMARY

Embodiments of the invention are directed to a platform for generating location information related to one or more access terminals. In embodiments of the invention, transaction data related to terminals such as badge readers or merchant points of sale may be received at a remote computer. Location information related to each of the users may be collected from mobile devices operated by the users on a periodic basis or at the time of the transactions. For example, in some embodiments, a remotely located service computer may receive location updates from one or more mobile devices associated with users. This location information may be matched with transaction information received from the terminals. This matching information may then be used to determine a current, accurate location of the merchant point of sale.

One embodiment of the invention can be directed to a computer comprising a processor, and a memory including instructions that, when executed with the processor, cause the terminal locator system to perform a method. The method may comprise receiving mobile location data from multiple mobile devices, each of the mobile devices associated with a user of a plurality of users, receiving multiple transaction data associated with a terminal, each of the transaction data of the multiple transaction data associated with a user of the plurality of users, determining, based at least in part on the mobile location data and the multiple transaction data, a set of locations associated with the terminal, and determining, from the set of locations associated with the terminal, a location of the terminal.

Another embodiment of the invention is directed to a method. The method may comprise receiving mobile location data from multiple mobile devices, each of the mobile devices associated with a user of a plurality of users, receiving multiple transaction data associated with a terminal, each of the transaction data of the multiple transaction data associated with a user of the plurality of users, determining, based at least in part on the mobile location data and the multiple transaction data, a set of locations associated with the terminal, and determining, from the set of locations associated with the terminal, a location of the terminal.

These and other embodiments of the invention are described in further detail below.

DETAILED DESCRIPTION

Figure 1:
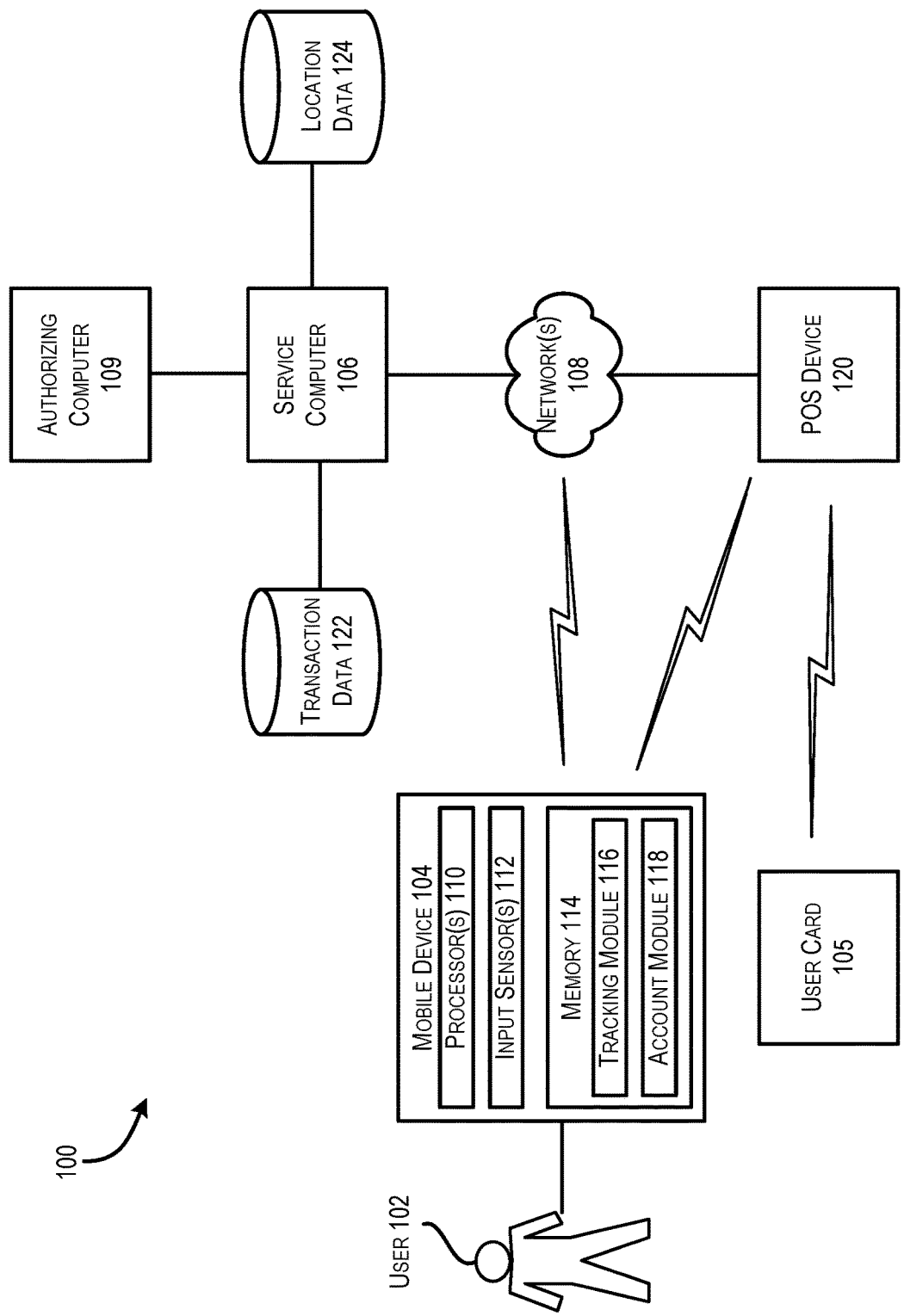
FIG. 1 depicts an example user interaction with the disclosed platform in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing embodiments of the invention, description of some terms may be helpful in understanding embodiments of the invention.

A "mobile device" may include any suitable device that can be easily transported by user. Examples of mobile devices are described in detail below.

"Account information" may be any information designed to provide access to an account for completing transactions. For example, account information may include a credit card number, a bank account number, a user id, a token, or any other suitable identifier. The account information may be associated with a monetary value, a discount, or a store credit. In some embodiments, account information may refer to a mileage plan or other reward point system. The account information may also be associated with an entity such as a bank, a merchant, a payment processing network, or a person. For example, in some embodiments, account information may identify a prepaid account (e.g., a gift card) or credit account with a third party entity. In other embodiments, account information may also include an account that is associated with an organization or a building to allow access to that organization or building.

An "account module" may include software for enabling an electronic device to communicate account information to a second electronic device. For example, an account module may be a software application configured to cause a mobile device to receive information related to a transaction from an access device and respond with account information needed to complete the transaction. In some embodiments, the account module may be a mobile wallet application stored on, and executed from, a smart phone device. In some embodiments, the account module may provide access to a decentralized virtual currency (e.g., bitcoin). In some embodiments, the account module may provide a "token" or other representation of a payment account. In some embodiments, the account module may include account information that will enable a person to access a location.

An "authorization request message" may be any suitable message that requests authorization for a transaction. An authorization request message may be an electronic message that is sent to a payment processing network and/or an issuer of a payment account to request authorization for a payment transaction. An authorization request message according to some embodiments may comply with ISO 8583, which is a standard for systems that exchange electronic transaction information associated with a payment made by a user using an access credential or a payment account. An authorization request message may also comprise additional data elements corresponding to "identification information" including, for example, a service code, a CVV (card verification value), a dCVV (dynamic card verification value), an expiration date, etc. An authorization request message may also comprise "transaction data," such as any information associated with a current transaction (e.g., the transaction amount, merchant identifier, merchant location, etc.) as well as any other information that may be utilized in determining whether to identify and/or authorize a payment transaction.

An "authorization response message" may be any electronic message that is a replay to an authorization request message. In some embodiments, the authorization response message may be generated by an issuing financial institution (i.e. issuer) or a payment processing network. The authorization response message may include an authorization code, which may be a code that an account issuing bank returns in response to an authorization request message in an electronic message (either directly or through the payment processing network) to a merchant's access device (e.g., point of sale terminal) that indicates approval of the transaction. The code may serve as proof of authorization. As noted above, in some embodiments, a payment processing network may generate and/or forward the authorization response message to the merchant. In some embodiments, the authorization response message may be associated with confirmation element data by a confirmation element identifier. In some cases, modified confirmation element data may be included in the authorization response message sent to an access device.

"Location information" may comprise any suitable identification of a location. For example, a location information may include coordinates (e.g., grid coordinates). In this example, a location information may be formatted as (X, Y) where each of X and Y represent positions along a separate axis. In some embodiments, coordinates may include a latitude and longitude. In some embodiments, a location information may also include data related to the location. For example, the location information may include a time that a person or thing was at the location. Location information may be stored in a data store with respect to a particular user, mobile device, or terminal.

A "mobile payment application" may be any application used to make a payment that is executed from a mobile device. In some embodiments, a mobile payment application may be an e-wallet or digital wallet application. In some embodiments, the mobile payment application may be linked to one or more payment accounts. In some embodiments, the mobile payment application may store one or more "tokens" or representations of payment accounts. In some embodiments, the mobile payment application may be linked to a decentralized virtual currency (e.g., bitcoins). In some embodiments, a mobile payment application may include an application used to complete a transaction without the use of currency. For example, the mobile payment application may complete a transaction using reward points or store credit.

A "terminal" may be electronic equipment including a device that can provide access to a computer. In some embodiments, the terminal may be a POS (point of sale) terminal, a badge reader, an access point, etc. In some cases, a terminal may be any device configured to complete a transaction between two entities.

A "service computer" may include any system associated with an entity that provides a resource or service. In some embodiments, the service computer may handle functionality of a computer application associated with the entity that provides the resource or service. The service computer may provide any suitable service. For example, the service computer may be operated by a merchant, a utility company, a payment processing network, a wallet provider, a merchant, a website operator, or a bank. In some embodiments, a service computer may be affiliated with a payment device. For example, the service provider may provide authorization and payment services associated with transactions involving the payment device.

A "transaction" may be any interaction or exchange between two or more parties. For example, a transaction may include a first entity requesting resources from a second entity. In this example, the transaction is completed when the resources are either provided to the first entity or the transaction is declined.

A "transaction information" may be any information related to a transaction between two entities. Transaction information may include information related to a completed transaction or a transaction that has not yet been completed. In some embodiments, the transaction information may include any suitable information related to a context of the transaction. For example, the transaction information may include a time at which the transaction was conducted, a terminal at which the transaction was conducted, an amount for which the transaction was conducted, an indication of an entity with whom the transaction was conducted, or any other suitable transaction-related information.

FIG. 1 depicts an example user interaction with the disclosed platform in accordance with at least some embodiments. In FIG. 1, a user 102 may be in possession of a mobile device 104, which may be in communication with a service computer 106. In some embodiments, the service computer 106 may be in communication with one or more additional devices via a network 108.

The mobile device 104 may be any type of portable communication device such as, but not limited to, a mobile phone, a smart phone, a personal digital assistant (PDA), a laptop computer, a tablet PC, etc. Additionally or alternatively, the mobile device 104 may be any type of wearable technology device, such as a watch, earpiece, glasses, etc. It may also be an automobile with remote communication capabilities.

The mobile device 104 may include one or more processors 110 capable of processing user input. The mobile device 104 may also include one or more input sensors 112 for receiving user input. As is known in the art, there are a variety of input sensors 112 capable of detecting user input, such as keyboards, mice, accelerometers, cameras, microphones, global positioning system (GPS), etc. Embodiments of one or more modules on the mobile device 104 may be stored and executed from its memory 114.

Turning to the contents of the memory 114 in more detail, the memory 114 may include a tracking module 116 configured to work with the processor 110 to communicate location data for the mobile device to a service computer 106. The memory 114 may also include an account module 118 that is capable of being executed by the processor 110 to provide payment information to an access device to complete a transaction. Although sample architecture 100 depicts an account module 118 as being included in the contents of the memory 114 of the device 104, some embodiments may not include an account module 118 in memory 114 of the device 104.

In some embodiments, the tracking module 116 may comprise code executable by the processor 110 to provide location data to an external device. For example, the tracking module 116 may comprise code executable by the processor 110 to receive location input from a user via the input sensors 112 and provide periodic updates to a service computer 106. For example, the tracking module 116 may comprise code executable by the processor to transmit location coordinates to the service computer 106 every five minutes, regardless of whether the mobile device 104 is currently involved in a transaction. In other embodiments, the mobile device 104 may comprise code, executable by the processor 110 to send location coordinates to the service computer 106 after the mobile device 104 or the user 102 has initiated a transaction. In some embodiments, the tracking module 116 may comprise code, executable by the processor 110 to provide a list of location and time data to the service computer 106 upon receiving a request for such data.

In some embodiments, the account module 118 may be configured to receive transaction information from, and provide payment information to, a terminal 120 such as a point of sale (POS) device. The account module 118 be programmed to cause the mobile device 104 to complete a transaction with a resource provider such as a merchant using account information (e.g., a payment account) associated with the user 102. In some embodiments, the user 102 may be required to log into the account module 118 or otherwise confirm his or her identity. It should be noted that some embodiments, of the disclosure may not include an account module 118. In some of those embodiments, the user may utilize a payment device that is not the same as the mobile device 104. For example, the user 102 may utilize a user card 105 such as a credit, debit, or prepaid card, a driver's license, an access badge, etc.

In some examples, the network 108 may include any one or a combination of many different types of networks, such as cable networks, the Internet, wireless networks, cellular networks, and other private and/or public networks. In addition, the network 108 may comprise multiple different networks. For example, the mobile device 104 may utilize a wireless local area network (WLAN) to communicate with a wireless router, which may then route the communication over a public network (e.g., the Internet) to the service computer 106. In some embodiments, the network 108 may be an electronic payment network (e.g., VisaNet).

In accordance with at least some embodiments, the mobile device 104 and/or the service computer 106 may be in communication with the terminal 120. In some embodiments, the terminal 120 may be an access device configured to interact with the mobile device 104 or the user card 105 in order to complete a transaction. For example, the terminal may transmit information related to a transaction (e.g., a terminal ID, the transaction amount, and date and/or time of the transaction) to be completed to a mobile device 104, and the mobile device 104 may respond with account information and other information.

In some embodiments, the terminal 120 may be configured to receive access information (e.g., payment information) from a separate mobile device such as the user card 105. For example, the terminal 120 may be configured to receive credit card account information from a credit card (e.g., via a credit card reader). In some embodiments, the service computer 106 may be involved in the authorization of payment information provided by the terminal 120. For example, the terminal 120 may be configured to generate and send an authorization request message to the service computer 106 that includes transaction details and payment information. In this example, the service computer 106 may be configured to authorize (or reject) the transaction via an authorization response. In other embodiments, the server computer 106 may route the authorization request message to an authorizing computer 109. The authorizing computer 109 may be operated by an authorizing entity such as an issuer. In this case, the authorizing computer 109 may be an issuer computer.

In some embodiments, the authorization request message may not be generated by the terminal 120 itself. In some embodiments, the authorization request message may be generated by an entity affiliated with the terminal 120 (e.g., a server maintained by an owner of the terminal 120). Likewise, a corresponding authorization response message may be received from the service computer 106 and/or the authorizing computer 109 by an entity affiliated with the terminal 120.

In some embodiments, the service computer 106 may be configured to store transaction data 122 and/or location data 124 in one or more databases. Transaction data 122 may comprise any information related to transactions conducted using one or more POS devices 120. In some embodiments, transaction data 122 may be populated using information identified in an authorization request message received (either directly or indirectly) from a POS device 120. Location data 124 may comprise any information related to a past or present location for a plurality of mobile device 104. In some embodiments, the location data 124 may comprise a set of location information in relation to time information. For example, the mobile device was at (X, Y) coordinates on date A at time B. In some embodiments, this location information may be stored in a row of a database table as a set of coordinates and a timestamp. In some embodiments, the location data 124 may be updated periodically as new location information is received from one or more mobile devices 104. In some embodiments, location information may be removed from location data 124 if it is older than a predetermined amount of time.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
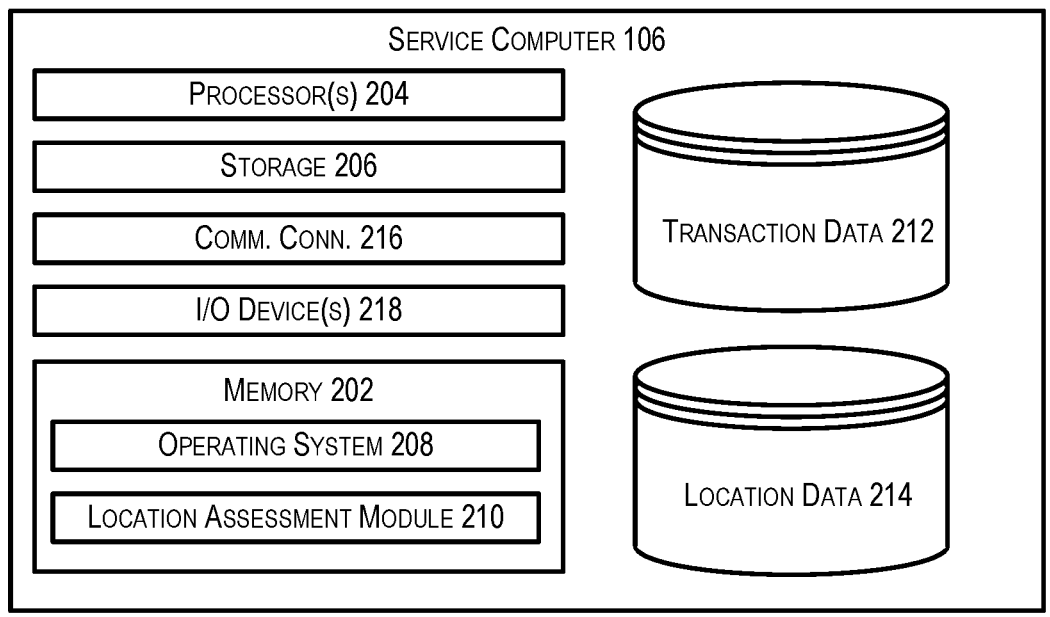
FIG. 2 depicts an illustrative example of a service computer capable of providing backend support for generating location information related to one or more merchant points of sale in accordance with at least some embodiments.

FIG. 2 depicts an illustrative example of a service computer 106 capable of providing backend support for generating location information related to one or more merchant points of sale in accordance with at least some embodiments. In some embodiments, the service computer 106 may be an example service computer 106 of FIG. 1.

The service computer 106 may include any suitable type of computing device, including a remotely located server computer. Additionally, it should be noted that in some embodiments, the service computer 106 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service computer 106 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service computer 106, the memory 202 may be volatile (such as random access memory (RAM)) and/or non-volatile (such as read-only memory (ROM), flash memory, etc.). The service computer 106 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a module for assessing a location associated with one or more point of sale devices (location assessment module 210). The memory 202 may also include transaction data 212, which provides data associated with a plurality of transactions and location data 214, which provides location data associated with a plurality of mobile devices. In some embodiments, the transaction data 212 and/or the location data 214 may be located outside of the service computer 106. For example, one or more transaction data 212 may be maintained by a third party entity (an entity unaffiliated with the service computer 106). In some embodiments, transaction data 212 and/or the location data 214 may be examples of transaction data 122 and/or location data 124 (respectively) depicted in FIG. 1. The transaction data 212 and location data 214 may comprise any suitable persistent data storage system. In some embodiments, the transaction data 212 and/or location data 214 may be stored in one or more databases. Information stored in the transaction data 212 or location data 214 may be accessed by the location assessment module 210 via a database query or any other suitable data retrieval means.

The memory 202 and the additional storage 206, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the mobile device 104 or the service computer 106.

In some embodiments, the location assessment module 210 may, in conjunction with the processor 204, be configured to generate location data for a terminal from transaction details and mobile device location data. In some embodiments, the location assessment module 210 may be initiated when a request is received to provide a location of a terminal. In some embodiments, the location assessment module 210 may be initiated upon the service computer 106 receiving an authorization request message that includes transaction information that is from the terminal 120. In some embodiments, the location assessment module 210 may comprise code, executable by the processor 204, to map time information in transaction data 212 obtained from the terminal 120 to a location of the mobile device 104 that is being carried by the user 102 at the time of the transaction at a "closest" point in time. For example, the service computer 106 may receive a location signal from the mobile device 104 every 15 minutes. The service computer 106 may receive an authorization request message for a transaction conducted with the user card 105 at the terminal 120 at 12:03 pm, so the service computer 106 may map the time of the transaction (e.g., 12:03 pm) to the closest time and location of the mobile device 104 (e.g., 12:00 pm, at latitude X, longitude Y). When this data is aggregated with data from past transactions from that terminal 120, the terminal location may be approximated as an average location. In some embodiments, the location assessment module 210 may be configured to translate location information into a geographic or physical address.

In some embodiments, the transaction data 212 may comprise information related to multiple transactions conducted between multiple users and multiple terminals. Transaction data 212 may include time information (e.g., a time of the transactions), information related to the users, information related to the terminals, or any other suitable transaction related information.

In some embodiments, the location data 214 may comprise location information related to one or more users. In some embodiments, the users may each be associated with an account maintained by the service computer 106. Location data 214 may include information related to locations with respect to time. In some embodiments, location data 214 may be updated with information received from a mobile device associated with the user. For example, location information may be provided to the service provider by a mobile device. Upon receipt of the location information, the service computer 106 may record a time of receipt. The service computer 106 may also identify a user associated with the mobile device. In some embodiments, the service computer may identify the user associated with the mobile device via a phone number, an international mobile station equipment identifier (IMEI), a serial number, or any other suitable unique identifier capable of being used to link a mobile device to a user. Once the user has been identified, the service computer 106 may update the location data to include an identity of the user, the time of the receipt, and a location.

The service computer 106 may also contain communications connection(s) 216 that allow the service computer 106 to communicate with a stored database, another computing device or server, user terminals, and/or other devices on the network(s) 106.

The service computer 106 may also include input/output (I/O) device(s) and/or ports 218, such as for enabling connection with a keyboard, a mouse, a pen, a voice input device, a touch input device, a display, speakers, a printer, etc.

Figure 3:
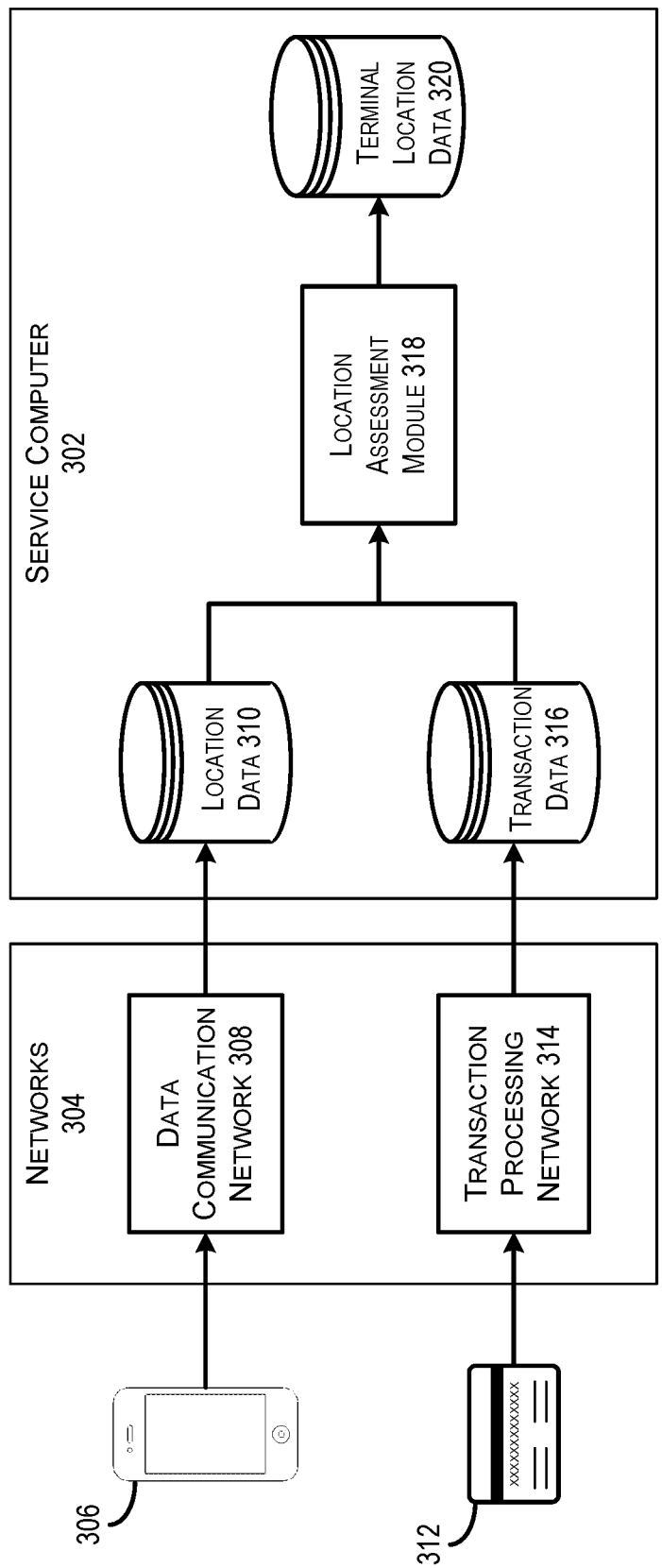
FIG. 3 depicts an example illustration of a data flow in accordance with at least some embodiments.

FIG. 3 depicts an example illustration of a data flow in accordance with at least some embodiments. In FIG. 3, a service computer 302 may be accessible via a plurality of networks 304. For example, the service computer 302 may be communicatively coupled to one or more network gateways (not shown) that provide access to various networks 304.

In some embodiments, the service computer 302 may be provided with location information by a mobile device 306 that may then be associated with a user. For example, in some embodiments, the service computer 302 may maintain account information for a plurality of users and a plurality of mobile devices operated by those uses. In some embodiments, the service computer may maintain device information related to a mobile device owned and/or operated by each of the users. For example, the service computer may maintain a phone number, an international mobile station equipment identifier (IMEI), a serial number, or any other suitable unique identifier with respect to each of the accounts that it maintains. Upon receiving location information from a mobile device 306, the service computer may match that location information to a particular user based on identifier information included with the location information.

In some embodiments, the mobile device 306 may provide location information to the service computer 302 using any type of data communication network 308. In some embodiments, the mobile device 306 may provide location information to a service computer 302 using multiple data communication networks 308. For example, the mobile device 306 may utilize a wireless local area network (WLAN) to communicate with a wireless router, which may then route the communication over a public network (e.g., the Internet) to the service computer 302. In another example, the mobile device 306 may utilize a 3G network to communicate with a wireless router, which may then route the communication over a public network to the service computer 302.

Location information provided to the service computer may be stored in a location data store 310. Location data store 310 may be located in any suitable non-volatile storage. In some embodiments, the location data store 310 may be a database. In some embodiments, the location data may be stored in a table that includes a user ID associated with the location, a time at which the location was reported, coordinates associated with the location, and any other suitable location-related information.

Additionally, the service computer 302 may receive information related to transactions that are conducted using a payment device 312. In some embodiments, the payment device 312 may be separate from the mobile device 306, while it may be the same in other embodiments. The information related to transactions may be collected from a terminal. In some embodiments, the service computer 302 may be owned and/or operated by a provider of a payment device, and may receive information related to transactions via a transaction processing network 314 (e.g., a payment processing network). In some embodiments, the information related to transactions may be provided to the service computer 302 via an authorization request message.

Information related to transactions that are received by the service computer 302 may be stored in a transaction data store 316. Transaction data store 316 may be located in any suitable non-volatile storage. In some embodiments, the transaction data store 316 may be a database. In some embodiments, the transaction data may be stored in a table that includes a user ID associated with the transaction, a time at which the transaction occurred, a terminal identifier associated with the transaction, and any other suitable transaction-related information.

In some embodiments, the service computer 302 may prompt the location assessment module 318 and a processor to determine a location of a particular terminal. In some embodiments, location assessment module 318 may be an example location assessment module 210 of FIG. 2. The location assessment module 318 may include instructions that, when executed, cause the service computer 302 to calculate a position of the terminal from information included in the location data 310 and the transaction data 316. In some embodiments, the location assessment module 318 may query transaction data related to a particular terminal from the transaction data store 316. Once a resulting set of transactions has been returned for the terminal, a user and timestamp associated with each of the transactions may be identified. The location assessment module 318 may then query the location data store 310 for location information associated with each of the identified users at the identified times. A potential terminal location may be calculated from the identified location information for each of the results. The potential terminal locations for each user may be compiled into a set of potential terminal locations.

In some embodiments, potential terminal location may be a "closest in time" location identified in the query. For example, if the transaction occurred at 12:34:56 and the location data store 310 includes location data for every five minute timestamp (e.g., 12:30:00, 12:35:00, 12:40:00, etc.), then the location data associated with the 12:35:00 timestamp would be the closest in time location. In some embodiments, the service provider may calculate a potential terminal location by applying a function to a closest in time location and a "next closest in time" location. A next closest in time location is the location associated with the second closest timestamp. In the above example, the next closest in time location would be the 12:30:00 timestamp. The function used to calculate a potential terminal location may be any suitable function that expresses a mathematical relationship between the two locations. For example, the location assessment module 318 may utilize a straight-line function (e.g., a function that assumes that the user is moving in a straight line between the two locations) to determine a potential location of the terminal. In this example, the service provider may calculate the potential terminal location by adding a vector to the location associated with the first occurring timestamp.

By way of illustration of a potential terminal location calculated using a straight-line function, consider the above example in which a transaction occurs at time 12:34:56, the closest in time location is $(X_2, Y_2)$ at time 12:35:00, and the next closest in time location is $(X_1, Y_1)$ at time 12:30:00 (note that the next closest in time location is represented by $(X_1, Y_1)$ because it is the first occurring timestamp). In this example, the transaction occurred at 4 minutes and 56 seconds after the first occurring timestamp 12:30:00 (or 296 seconds after the timestamp). The time interval between the closest and next closest in time locations is 5 minutes (or 300 seconds). The location assessment module 318 may be programmed to calculate a magnitude (M) of 0.987 (296 seconds/300 seconds). The location assessment module 318 may also calculate a vector of $(X_2-X_1, Y_2-Y_1)$ that represents a position between the two locations. Note that in this example, $(X_1, Y_1)$ is subtracted from $(X_2, Y_2)$ because $(X_1, Y_1)$ is associated with the first occurring timestamp of the two timestamps (this indicates a direction of travel of the user). Using this technique, the vector may be multiplied by the magnitude and added to the location associated with the first occurring timestamp to calculate a potential terminal location. The resulting potential terminal location may be expressed as:

$$T_P=(X_1,Y_1)+M^*(X_2-X_1,Y_2-Y_1)$$

In the above function, $T_P$ is a potential terminal location. This example function assumes that the user is traveling in a straight line between the first location and the second location at a constant speed. The potential terminal location in the example represents the user's location at the time of the transaction and represents an intermediate location (or a location between the first and second location). It should be noted that the above described example function is not intended to be limiting. Numerous other functions may be used to calculate a potential terminal location, each of which should be treated as an equivalent function. In some embodiments, the potential terminal location may be a location associated with the closest in time timestamp. In some embodiments, the potential terminal location may be a location associated with the timestamp occurring immediately before or immediately after the time of the transaction.

In some embodiments, there may be a bias toward, or the system may be weighted toward, a particular location based on a transaction time. For example, the location associated with the timestamp immediately before the transaction may be more likely to be associated with the terminal location if the user was shopping at, or eating at, a particular merchant that owns the terminal prior to the transaction. By way of illustration, consider a scenario in which a terminal is associated with a retail location or other suitable merchant having a physical location. In this scenario, a user is more likely to spend time browsing near the terminal before the transaction (a checkout in this scenario) and may be likely to leave the vicinity of the terminal immediately following the transaction. In this illustration, it may be reasonable to bias the calculation of a potential terminal location toward the first occurring transaction. In some embodiments, the location associated with the timestamp immediately preceding the transaction time may be used as a potential terminal location. In some embodiments, this may mean that instead of a straight-line function used to calculate an intermediate location, a logarithmic function or exponential function is used to calculate it. In other words, a function may be used that assumes that the user's movement from the first location to the second location is not at a constant speed.

In accordance with at least some embodiments, a set of potential terminal locations may be calculated from location data associated with each user of the plurality of users identified. In some embodiments, the location assessment module 318 may filter the set of potential terminal locations by removing outlier locations. For example, a distance may be calculated between each of the potential terminal locations in the set of potential terminal locations. If the distance between one particular potential terminal location and the majority of other potential terminal locations is greater than a threshold value, then it may be removed from the set of potential terminal locations. Once the set of potential terminal locations has been compiled (and potentially filtered), it may be used to calculate a terminal location. In some embodiments, the terminal location may be calculated as an average of the potential terminal locations. For example, the terminal location may be calculated as:

$$T_L=([X_1+X_2+\ldots X_N]/N,[Y_1+Y_2+\ldots Y_N]/N)$$

In the above function, $T_L$ is the calculated terminal location and N is the number of potential terminal locations in the set of potential terminal locations. In some embodiment, the set of potential terminal locations may be limited to N such that only the last N transactions are considered. In this example, N may be a predetermined number of transactions. It should be noted that the above described example function is not intended to be limiting. Numerous other functions may be used to calculate a terminal location from a set of potential terminal locations, each of which should be treated as an equivalent function. Once the location assessment module 318 has calculated a value for $T_L$, that value may be stored in relation to the terminal in a terminal location data store 320.

As another way of expressing the above, consider the following. Given a $T_X$ that represents a location associated with a transaction number X at terminal T, a variable GL_A may be used to represent an average geo-location of the terminal T. In this example, GL_A may be set equal to $(T_1+T_2+\ldots+T_N)/N$, where N is a number of transactions. In some embodiments, N may be a predetermined number of transactions. For example, N may represent the last 50 transactions, such that GL_A is set equal to the average location associated with the last 50 transactions conducted at terminal T. In some embodiments, a number of the transactions associated with $T_1$ through $T_X$ may be filtered as outliers. For example, only a predetermined number of transactions may be used from the transactions $T_1$ through $T_X$. In some embodiments, this predetermined number may be a percentage. For example, a distance between the average location (GL_A) and each of the locations associated with $T_1$ through $T_X$ may be calculated. If the predetermined number of transactions to be used in the example is 90%, then the 5 locations associated with transactions $T_1$ through $T_X$ would be removed, leaving the 45 closest transaction locations to GL_A. Once the transaction location set has been filtered in this way, a GL(T) may be set to the average of the remaining transaction locations, where GL(T) represents a geolocation of the terminal T.

In other embodiments, a boundary function may be determined by simply plotting the locations of the various transactions conducted using a particular terminal, while excluding outliers that are outside of a predetermined threshold.

Figure 4:
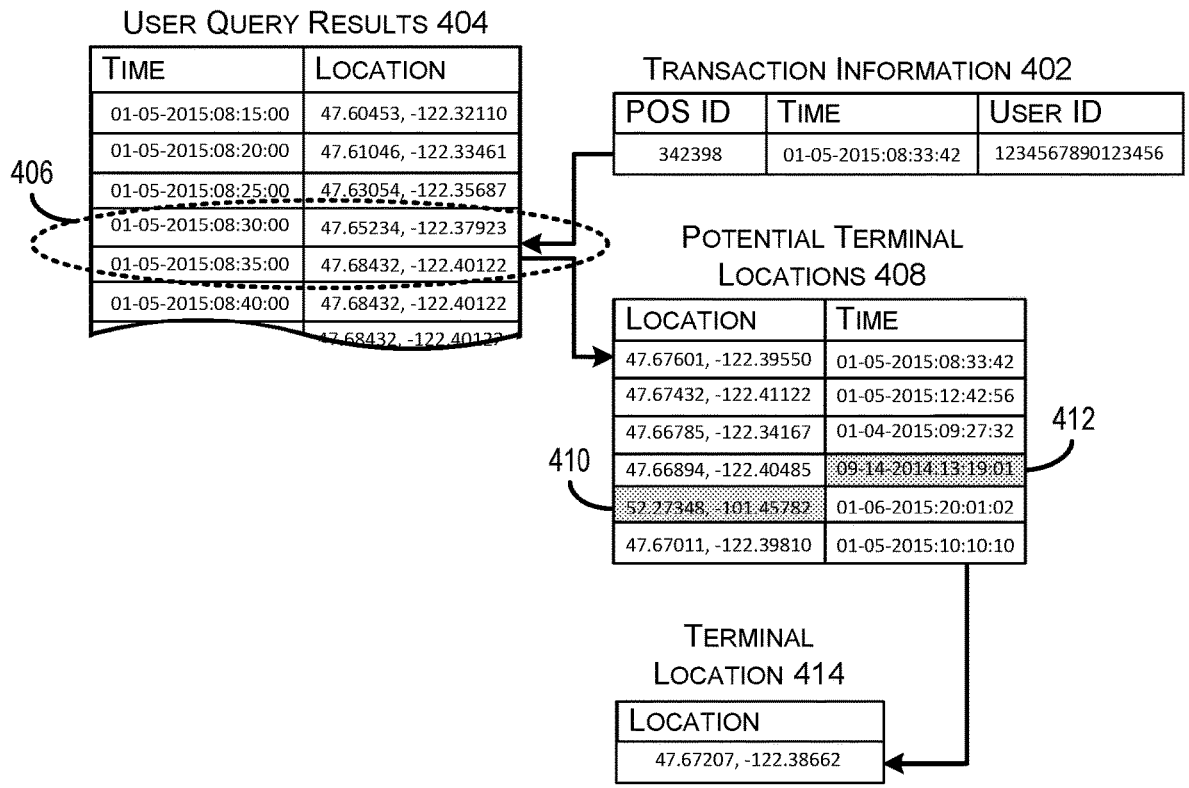
FIG. 4 depicts a specific example of a terminal location determination that may be implemented in accordance with at least some embodiments.

FIG. 4 depicts a specific example of a terminal location determination that may be implemented in accordance with at least some embodiments. In at least some embodiments, a service computer may begin determining a terminal location by querying a transaction database for a set of transactions conducted at that terminal. In some embodiments, the transactions may have been conducted using a credit card or other payment device associated with a user. In FIG. 4, the example is illustrated using a single transaction information 402 from the set of transactions. As depicted, the transaction information 402 may be associated with a POS device identifier or terminal identifier (POS ID), a time that the transaction was conducted, and a user identifier (User ID). The POS ID may be any unique identifier capable of being used to identify a particular POS device or terminal. In some embodiments, a POS ID may include a merchant identifier and terminal number. In some embodiments, the POS ID may be a string of alphanumeric characters. In some embodiments, the POS ID may be a number. The time that the transaction was conducted may be presented in any date-time format. In some embodiments, the time may be presented as a timestamp. The User ID may be unique identifier capable of being used to identify a particular user or account holder. In some embodiments, the User ID may be a string of alphanumeric characters. In some embodiments, the User ID may be a number such as a primary account number.

As depicted in FIG. 4, the transaction information 402 may be used to query for a set of locations associated with a particular user based on the User ID. In the depicted example, user query results 404 represents a set of locations and times for user "1234567890123456." It should be noted that each transaction may be associated with a different user and a set of user query results may be returned in this manner for each of the User IDs associated with each of the transactions of the set of transactions for the terminal. In some embodiments, a User ID may return an empty set of search results. This may mean that the user has not enrolled in a location update program or may not have a mobile device. In these situations, transactions associated with empty sets of location data may be ignored.

In some embodiments, the location information associated with the closest in time result may be determined to be a potential terminal location. In some embodiments, the potential terminal location may be calculated from multiple location data 406. For example, as depicted in FIG. 4, a transaction conducted at 01-05-2015:08:33:42 may result in the user query results 404 containing a closest in time result at 01-05-2015:08:35:00 and a next closest in time result at 01-05-2015:08:30:00. The potential terminal location may be calculated from the respective location data (47.65234, −122.37923 and 47.68432, −122.40122) associated with these two query results.

In the depicted example, a potential terminal location may be calculated from the closest in time location data and the next closest in time location data (depicted at 406). In some embodiments, magnitude or multiplier may be calculated from time information. For example, the time of the transaction (01-05-2015:08:33:42) is 78 seconds from the closest in time transaction and 222 seconds from the next closest in time transaction (at timestamp 01-05-2015:08:35:00). Accordingly, a magnitude may be calculated as 222/(78+ 222), or 0.74. Note that in this example, 222 is used in the numerator because it corresponds to the first occurring timestamp. To identify a potential terminal location using a straight-line function, a vector may be calculated as the closest in time location (47.68432, −122.40122) minus the next closest in time location (47.65234, −122.37923), or (0.03198, −0.02199). Note that in this example, a subsequently occurring location is subtracted from a first occurring location in order to identify a direction of travel for the user, regardless of which is a closest in time location or a next closest in time location. This vector may then be multiplied by the magnitude (0.74) and added to the first occurring location (47.65234, −122.37923) to get a potential terminal location of (47.67601, −122.39550). It should be noted that this location value falls between the two locations identified, and may provide a more accurate potential terminal location.

As depicted in FIG. 4, the calculated potential terminal location may be appended to a set of potential terminal locations 408. For example, the above steps may be performed with respect to multiple transactions/users in order to generate multiple potential terminal locations. In some embodiments, the set of potential terminal locations may be filtered to remove potential terminal locations that are more than a predetermined distance from the majority of the potential terminal locations in the set. For example, the location depicted at 410 is several hundred miles from the rest of the potential terminal locations in the set and may therefore be removed. In some embodiments, the set of potential terminal locations may be filtered based on time or a number of transactions. For example, all locations associated with transactions occurring before a predetermined time may be removed. By way of illustration, if a predetermined threshold indicates that only locations associated with transactions occurring within the last three months should be used, then the location depicted at 412 may be removed from the set of potential terminal locations, as it is more than three months older than the other transactions. In some embodiments, the system may use only the last N transactions associated with the terminal, where N is a predetermined number of transactions. As new transaction information is received by the service computer, the terminal location may be updated accordingly.

Once the set of potential terminal locations has been filtered appropriately, a terminal location 414 may be calculated from the set of potential terminal locations. In some embodiments, the terminal location 414 may be set to the median (or middle) potential terminal location of the set of potential terminal locations. In some embodiments, the terminal location may be calculated as a mean (or average) of the potential terminal locations in the set of potential terminal locations. In the depicted example, there are four potential terminal locations. An average of those terminal locations yields ([47.67601+47.67432+47.66785+ 47.67011]/4, [−122.39550+−122.41122+−122.34167+− 122.39710]/4), or (47.67207, −122.38662). In this example, the terminal location 414 may be populated with (47.67207, −122.38662).

Figure 5:
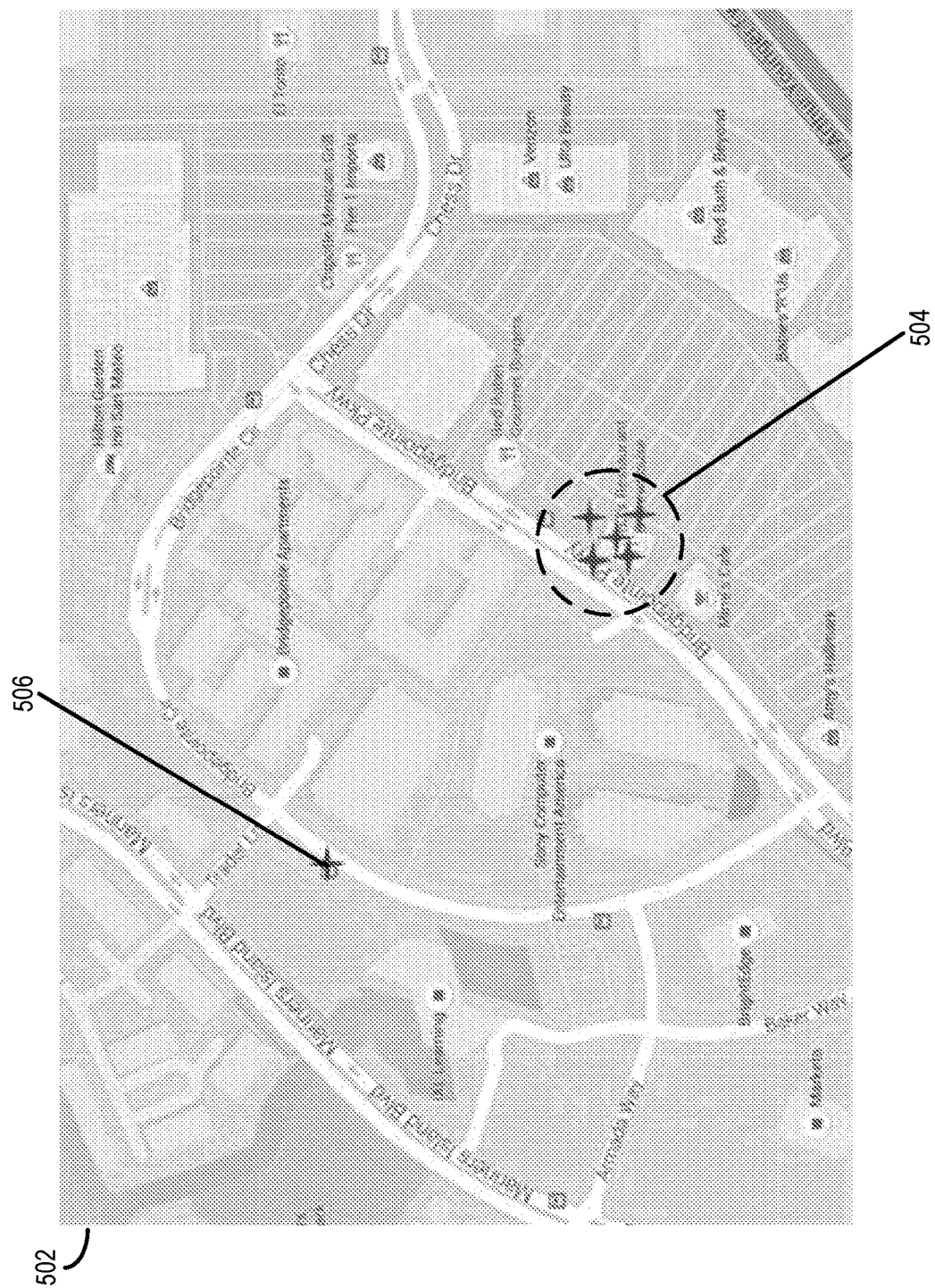
FIG. 5 depicts an illustrative example of a set of potential terminal locations that may be determined in accordance with at least some embodiments.

FIG. 5 depicts an illustrative example of a set of potential terminal locations that may be determined in accordance with at least some embodiments. In FIG. 5, a coordinate grid 502 may be depicted with multiple axes. In some embodiments the coordinate grid may be a map with axes represented by latitude and longitude. As described above, the service computer may calculate a set of potential terminal locations 504 associated with a particular terminal based on transactions conducted at the terminal and location information for users.

As depicted, there may be outlier potential terminal locations 506 that are filtered out or removed from the set of potential terminal locations 504. Outlier terminal locations 506 may be created from a number of scenarios. For example, a user may power down his or her mobile device or place the mobile device in "airplane mode." This may prevent the mobile device from reporting a location to the service computer, creating a "last location" that is inaccurate. In another example, the terminal may have been moved or relocated.

Once the set of potential terminal locations 504 has been identified, a terminal location may be calculated based on the set. In some embodiments, the terminal location may be represented by the point in the middle of the cluster of potential set locations. In some embodiments, the terminal location may be an average value of each of the depicted potential terminal locations.

In some embodiments, a clustering algorithm may be used to identify one or more centroid locations associated with the set of potential terminal locations, with a centroid representing a location of the terminal. In this example, the service computer may determine that there is more than one centroid associated with a particular terminal. The service provider may ascertain, based on this information, that the merchant is utilizing more than one terminal that uses the same terminal ID. In this way, the service computer may determine or confirm a number of terminals being used by the merchant.

Figure 6:
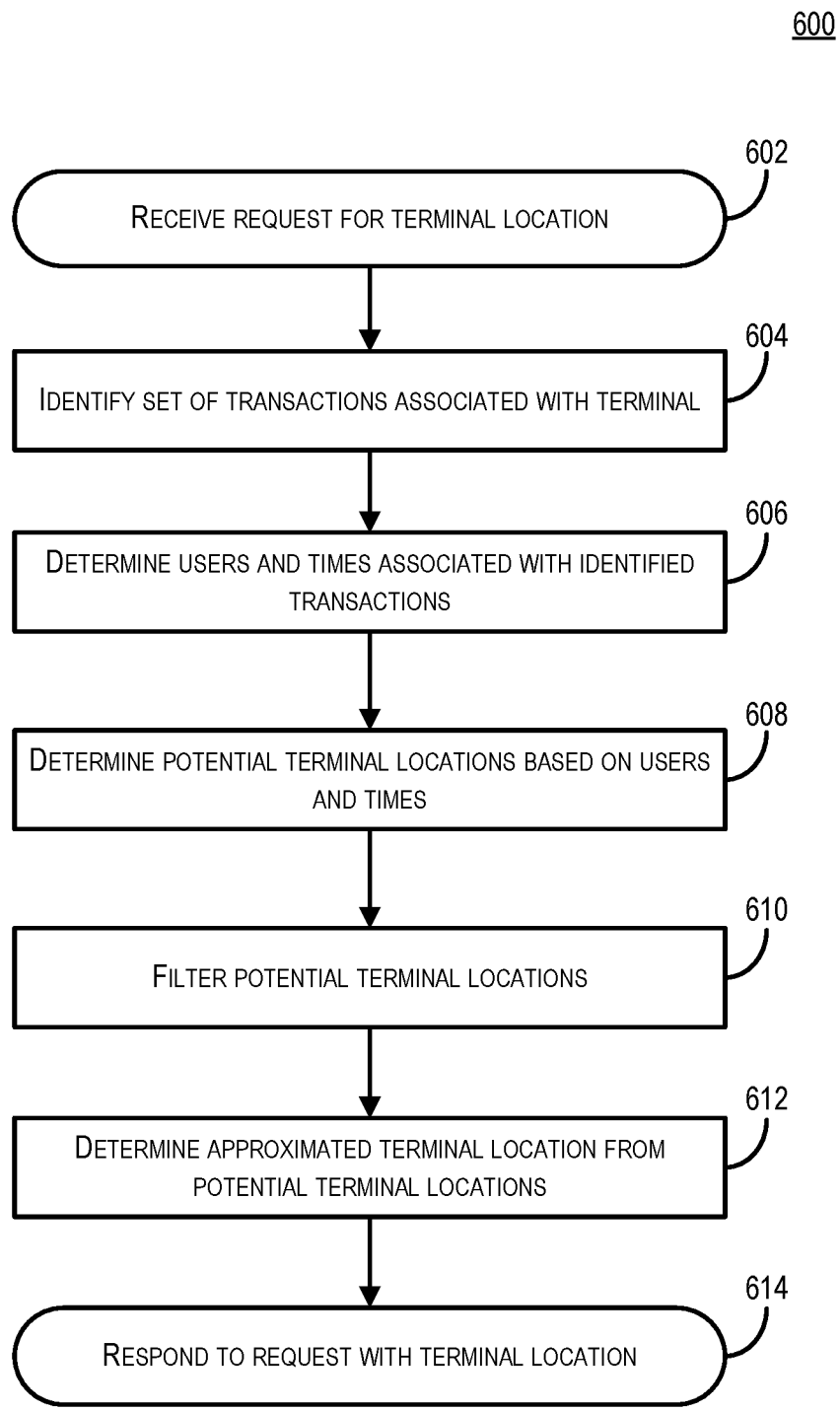
FIG. 6 depicts a process for locating a terminal using transaction data and user location data in accordance with at least some embodiments.

FIG. 6 depicts a process for locating a terminal using transaction data and user location data in accordance with at least some embodiments. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Process 600 may begin at 602, when a request is received for a location of a terminal. In some embodiments, process 600 may be initiated without receiving a request. For example, process 600 may be initiated on a periodic basis. By way of illustration, the disclosed process may be performed on an hourly, daily, or monthly basis to update location information associated with one or more terminals.

In some embodiments, a set of transactions may be identified as being associated with the terminal 604. In some embodiments, a transaction database may be queried from records related to the terminal in question. In some embodiments, the transaction records may be filtered according to one or more criteria. For example, the transaction records may be filtered to include only the last X transactions, where X is a predetermined number of transactions. In another example, the transaction records may be filtered to include only those transactions occurring after Y time, where Y time is a predetermined date or a date that occurred a predetermined amount of time in the past.

Once a set of relevant transactions has been identified, a set of users and/or a time may be determined for each of the identified transactions at 606. In some embodiments, the set of transactions may be filtered to remove records associated with users for whom a service provider does not maintain location information. For example, a subset of the users associated with the transactions related to the terminal may provide authorization for, or be involved in a program in which, location data is provided by their mobile devices to a service computer. In this example, the service computer may only maintain location data for that subset of users. Accordingly, the transaction data may be filtered to include only those transactions related to that subset of users.

In some embodiments, a set of potential terminal locations may be determined based on the determined users and times at 608. In some embodiments, the set of potential terminal locations may be generated using a closest in time location associated with each of the identified users. In some embodiments, each potential terminal location in the set of potential terminal locations may be calculated based on two or more locations associated with each user. For example, two relevant timestamps associated with a user may be identified between which the transaction is estimated to have occurred. A potential terminal location may be calculated as a location between the locations associated with each of relevant timestamps.

In other embodiments, a set of terminal locations do not need to be determined using the calculation based upon two or more locations. In such embodiments, after each authorization request message is received from the terminal, the service computer may query the mobile device associated with the account number (or other user identifier) in the authorization request. The service computer may then retrieve or determine the location of the mobile device (using, e.g., GPS, cell tower strength, etc.).

In some embodiments, the set of potential terminal locations may be filtered according to one or more criteria at 610. For example, the set of potential terminal locations may be filtered to remove outlier locations, or locations that are more than a predetermined distance from the majority of the other potential terminal locations. In another example, the set of potential terminal locations may be filtered to remove transactions that occurred more than a predetermined amount of time in the past, or are older than a predetermined age. In some embodiments, a set of potential terminal locations may be filtered based on a type of mobile device used to gather location data associated with the potential terminal location. In some embodiments, a set of potential terminal locations may be filtered based on a status of a user associated with the potential terminal location.

In some embodiments, the set of potential terminal locations may be used to approximate a terminal location at 612. In some embodiments, each of the potential terminal locations in the set of potential terminal locations may be averaged to approximate a likely terminal location. In some embodiments, the terminal location may be approximated by selecting the most central of the set of potential terminal locations. In some embodiments, the terminal location may be approximated by selecting one or more median values. For example, the terminal location may be approximated as (X, Y), where X is a median latitude of all latitudes in the set of potential terminal locations and Y is a median longitude of all longitudes in the set of potential terminal locations. Once the terminal location has been approximated, it may be provided to the requestor in a response to the received request at 614.

Once a terminal is appropriately mapped, then a number of fraud detection processes can be performed. For example, in a payment transaction, a fraudulent user may attempt to conduct a transaction with a stolen credit card. The fraudulent user may then swipe or tap the stolen credit card to the terminal, and the terminal may receive the account information from the terminal. The terminal may then generate an authorization request message which may be transmitted to a service computer such as a payment processing network via a transport computer. Before forwarding the authorization request message to the payment processing network, the payment processing network may determine the location of the real user's mobile phone. This can be performed by querying a location database as described above to determine the phone's current location, or the payment processing network may communicate with the mobile phone to obtain its location. If the locations of the mobile phone and the terminal are not proximate to each other (e.g., within 100 feet), then the transaction may be declined by the payment processing network or the payment processing network may transmit the authorization request message to a downstream issuer with the proximity information or with a fraud score that effectively incorporates the conclusion that the mobile phone and the terminal are not proximate to each other. In this way, fraudulent transactions may be prevented.

In another example which does not relate to payments, a fraudulent user may attempt to access a building with a stolen access badge. The fraudulent user may then swipe or tap the stolen access badge to the terminal. The terminal may then generate an authorization request message which may be transmitted to a service computer. The service computer may determine the location of the real user's mobile phone. This can be performed by querying a location database as described above to determine the phone's current location, or the service computer may communicate with the mobile phone to obtain its location. If the locations of the mobile phone and the terminal are not proximate to each other (e.g., within 100 feet), then the transaction may be declined. In this way, fraudulent access transactions may be prevented.

In an example embodiment of the disclosure designed to frustrate various types of fraud, a service computer may receive an authorization request message comprising account information from a terminal. The terminal may be any device capable of completing a transaction. For example, the terminal may be a POS device. In another example, the terminal may comprise a badge reader that permits access to a facility The account information may be related to a transaction. For example, the account information may be payment account information used to complete a purchase transaction. In another embodiment, the account information may be access credentials used to gain entry to a secure area or secure resources. Once the account information is received from the terminal, the location of the service terminal may be determined using the techniques described above with respect to FIGS. 3 and 4. The service computer may identify a mobile device associated with the account information. For example, the mobile device may be a cellular phone or an electronic fob that is associated with the account. In some embodiments, the service computer may store an identifier for the mobile device in a database record associated with the account information. Upon identifying a mobile device associated with the account information, the service computer may transmit a signal to the mobile device to cause it to relay its coordinates to the service computer. In this way, the service computer may determine a location of the mobile device associated with the account.

Once the location of the mobile device associated with the account has been identified, it may be compared to the location of the terminal to determine if the two locations are proximate to each other. If the two locations are proximate to each other, then approval for the transaction may be initiated. In some embodiments, the service computer may determine a likelihood of fraud for the transaction based on a proximity of the two locations. For example, a likelihood of fraud may be proportional to the distance between the two locations. In some embodiments, approving of the transaction may be initiated when the service computer determines that the location of the terminal and the location of the mobile device are proximate to each other. In some embodiments, initiating approving of a transaction may comprise sending the authorization request message to an authorizing computer, which may subsequently make an authorization decision based on the authorization request.

Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the disclosed processes may be performed by at least the service computer 106 depicted in FIG. 2. The code may be stored on a computer-readable storage medium, for example, in the form of a computer program including a plurality of instructions executable by one or more processors. The computer-readable storage medium may be non-transitory.

Embodiments of the invention provide for a number of technical advantages. For example, embodiments of the invention enable a service computer to accurately pinpoint a location of a point of sale device. Current systems require that merchants manually provide address location to be associated with a point of sale. However, this address location only points to a general vicinity (the address) in which the point of sale is located. Furthermore, merchants often provide an address for a corporate headquarters or other location for the point of sale, which affects the accuracy of any systems that utilize the location information. In the described invention, the service computer is not required to rely on a merchant's disclosure of location information. The location information provided by this system may be used in fraud detection systems, targeted advertising, user reward programs, or any other system in which accurate point of sale location information may be useful. In some embodiments, the described invention may be utilized to determine whether a merchant is using multiple points of sale that utilize the same point of sale identifier.

Embodiments of the invention can automatically map and determine the location of various terminals, without any sort of pre-registration on the part of the owners of those terminals. Also, because current transaction data is used to map the terminals, the location of such terminals is accurate. As noted previously, terminals can be moved by their owners and embodiments of the invention can accurately pinpoint the location of terminals.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A user device comprising:
a global positioning system device configured to obtain location data for the user device at periodic intervals;
a processor; and
a memory including:
a tracking module configured to communicate the location data for the user device to a service computer, and
an account module storing payment information and configured to communicate the payment information to a POS terminal of a merchant, wherein the user device includes a mobile communication device, wherein the account module is a mobile wallet application stored on the mobile communication device,
the memory storing instructions that, when executed with the processor, cause the user device to at least:
receive, by the account module of the user device over a first communication channel, transaction information associated with a transaction from the POS terminal;
transmit, by the account module of the user device over the first communication channel, the payment information to the POS terminal of the merchant at a first time to conduct the transaction, wherein a location of the POS terminal is unknown to the service computer;
obtain, by the global positioning system device of the user device at periodic intervals, the location data for the user device, the location data comprising geographic locations of the user device obtained at different points in time regardless of the user device being involved in any transaction, wherein the location data includes a geographic location information component and a time information component associated with the geographic location information component;
receive, by the user device from the service computer, a request for the location data associated with the first time;
wirelessly transmit, using the tracking module of the user device to the service computer over a second communication channel different from the first communication channel, a first geographic location of the user device obtained at a second time; and
wirelessly transmit, using the tracking module of the user device to the service computer over the second communication channel, a second geographic location of the user device obtained at a third time, the second time and the third time being closest in proximity to the first time associated with the transaction,
wherein the location of the POS terminal is determined using the first time, the first geographic location of the user device, the second time, the second geographic location of the user device, and the third time,
wherein the location of the POS terminal is determined as a location between the first geographic location of the user device and the second geographic location of the user device
wherein the user device is present at same locations as the POS terminal when the transaction is conducted, and
wherein the account module of the user device is programmed to cause the user device to complete the transaction with the merchant.

2. The user device of claim 1, wherein the first geographic location of the user device is obtained at the point in time before the time associated with the transaction which is closest in proximity to the time associated with the transaction and the second geographic location of the user device is obtained at the point in time after the time associated with the transaction which is closest in proximity to the time associated with the transaction.

3. The user device of claim 1, wherein detecting that a transaction has been conducted with the merchant comprises receiving an indication of the transaction from the service computer.

4. The user device of claim 3, wherein the service computer provides the indication of the transaction based on a mapping between an identifier associated with the user device and an access credential used to conduct the transaction.

5. The user device of claim 4, wherein the identifier comprises one of a phone number, an international mobile station equipment identifier (IMEI), or a serial number associated with the user device.

6. The user device of claim 1, wherein the service computer is caused to determine the location of the POS terminal using a straight-line function.

7. The user device of claim 1, wherein the transaction is for a resource managed by the merchant.

8. A computer-implemented method comprising:

receiving, by an account module of a user device over a first communication channel, transaction information associated with a transaction from a POS terminal of a merchant, wherein the user device includes a mobile communication device, wherein the account module is a mobile wallet application storing payment information;

transmitting, by the account module of the user device over the first communication channel, the payment information to the POS terminal of the merchant at a first time to conduct the transaction, wherein a location of the POS terminal is unknown to a service computer;

obtaining, by a global positioning system device of a user device at periodic intervals, location data for the user device, the location data comprising geographic locations of the user device obtained at different points in time regardless of the user device being involved in any transaction, wherein the location data includes a geographic location information component and a time information component associated with the geographic location information component, wherein a tracking module of the user device is configured to communicate the location data for the user device to the service computer;

receiving, by the user device from the service computer, a request for the location data associated with the first time;

determining, by the user device, a time associated with the transaction; and wirelessly transmitting, by the tracking module of the user device to the service computer over a second communication channel different from the first communication channel, a first geographic location of the user device obtained at a second time; and wirelessly transmitting, using the tracking module of the user device to the service computer over the second communication channel, a second geographic location of the user device obtained at a third time, the second time and the third time being closest in proximity to the first time associated with the transaction, wherein the location of the POS terminal is determined using the first time, the first geographic location of the user device, the second time, the second geographic location of the user device, and the third time, wherein the location of the POS terminal is determined as a location between the first geographic location of the user device and the second geographic location of the user device, wherein the user device is present at same locations as the POS terminal when the transaction is conducted, and wherein the account module of the user device is programmed to cause the user device to complete the transaction with the merchant.

9. The method of claim 8, wherein the first geographic location of the user device is obtained at the point in time before the time associated with the transaction which is closest in proximity to the time associated with the transaction and the second geographic location of the user device is obtained at the point in time after the time associated with the transaction which is closest in proximity to the time associated with the transaction.

10. The method of claim 8, wherein detecting that a transaction has been conducted with the merchant comprises receiving an indication of the transaction from the service computer.

11. The method of claim 10, wherein the service computer provides the indication of the transaction based on a mapping between an identifier associated with the user device and an access credential used to conduct the transaction.

12. The method of claim 11, wherein the identifier comprises one of a phone number, an international mobile station equipment identifier (IMEI), or a serial number associated with the user device.

13. The method of claim 8, wherein the service computer is caused to determine a location of the POS terminal using a straight-line function.

14. The method of claim 8, wherein the transaction is for a resource managed by the merchant.

15. The user device of claim 1, wherein the memory stores further instructions that, when executed with the processor, cause the user device to:

prompt a user of the user device to log in to the account module of the user device.

* * * * *